July 19, 1966  A. MACHAŇ  3,261,276
PHOTOGRAPHIC CASSETTE FOR PLATES AND SHEET FILM
Filed June 26, 1964  3 Sheets-Sheet 1

INVENTOR.
Antonín Machaň
BY

INVENTOR.
Antonín Macháň

3,261,276
PHOTOGRAPHIC CASSETTE FOR PLATES
AND SHEET FILM
Antonín Machán, Prerov, Czechoslovakia, assignor to
Meopta, narodni podnik, Prerov, Czechoslovakia
Filed June 26, 1964, Ser. No. 378,226
Claims priority, application Czechoslovakia, July 22, 1963,
4,212
9 Claims. (Cl. 95—66)

This invention relates to photographic cassettes for plates, sheet film, and similar light-sensitive sheet material, and particularly to a signaling arrangement which automatically indicates the condition of the cassette contents while the casette is closed and sealed against entry of light.

The object of the invention is the provision of a cassette equipped to indicate automatically whether it is loaded with light sensitive material, and whether the material contained therein has been exposed.

A more specific object is the provision of a cassette in which a visible signal is automatically generated by movable indicia to indicate the condition of the cassette contents.

With these and other objects in view, as will hereinafter become apparent, the invention, in one of its aspects, provides a normally light-tight shell which includes a cover member which is slidable toward and away from an operative position in which it closes an aperture in the shell. Light sensitive sheet material, such as a film, a glass plate, and the like, is positioned in the cavity within the shell in a predetermined position by positioning means which are movable toward and away from an operative position.

The presence of sheet material in the afore-mentioned predetermined position is sensed, and a first visible signal is generated when the absence of sheet material is sensed. When the positioning means move, a second signal is generated, and a third signal is generated when the cover slides. The signals are arranged in such a manner that they obstruct each other under certain conditions so that no more than one signal is visible at any one time.

Other features and may of the attendant advantages of this invention will be readily appreciated as the same becomes better understood by reference to the following detailed description of a preferred embodiment when considered in connection with the accompanying drawing in which.

Figure 2:
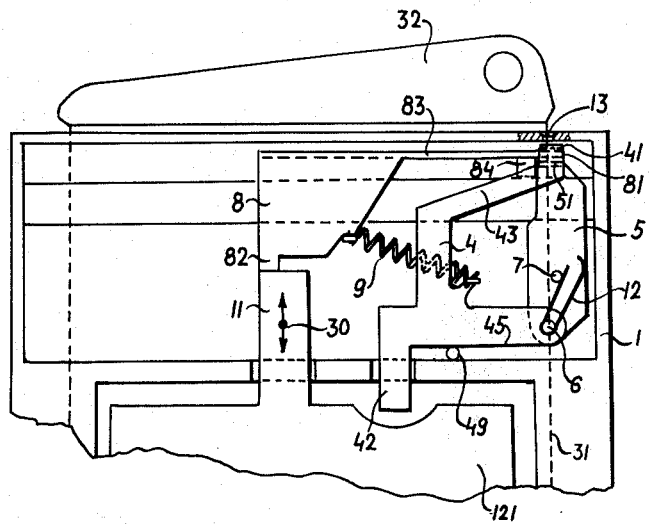
FIG. 2 shows the cassette of FIG. 1 in fragmentary rear-elevation without its back wall.
Figure 3:
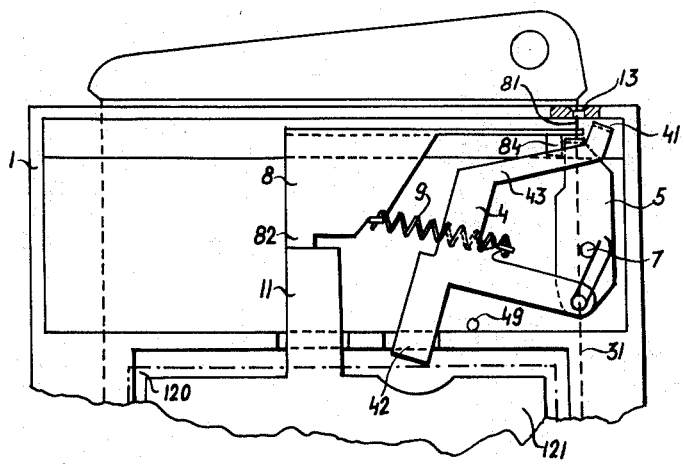
Figure 4:
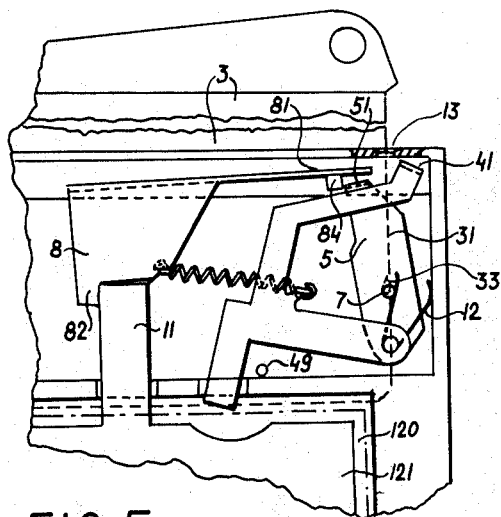
Figure 7:
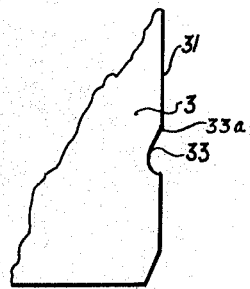
Figure 5:
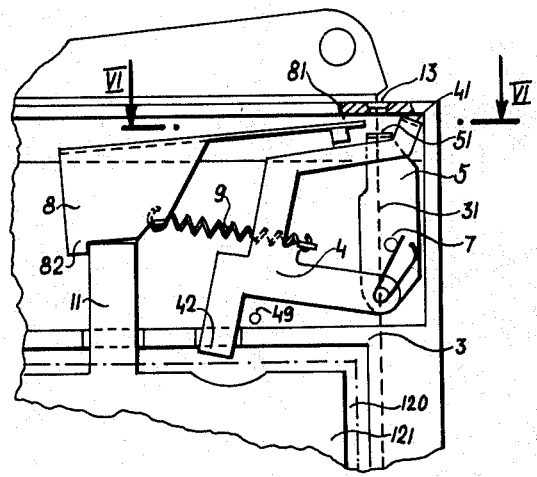
Figure 6:
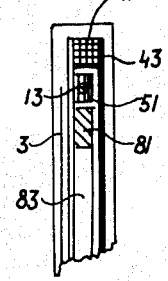

FIGS. 3, 4, and 5 illustrate the apparatus of FIG. 2 in different operational positions;

FIG. 6 shows the device of FIG. 5 in fragmentary sectional plan view on the line VI—VI;

FIG. 7 shows a detail of the sliding cover of the cassette in a view corresponding to those of FIGS. 2 to 5.

Figure 1:
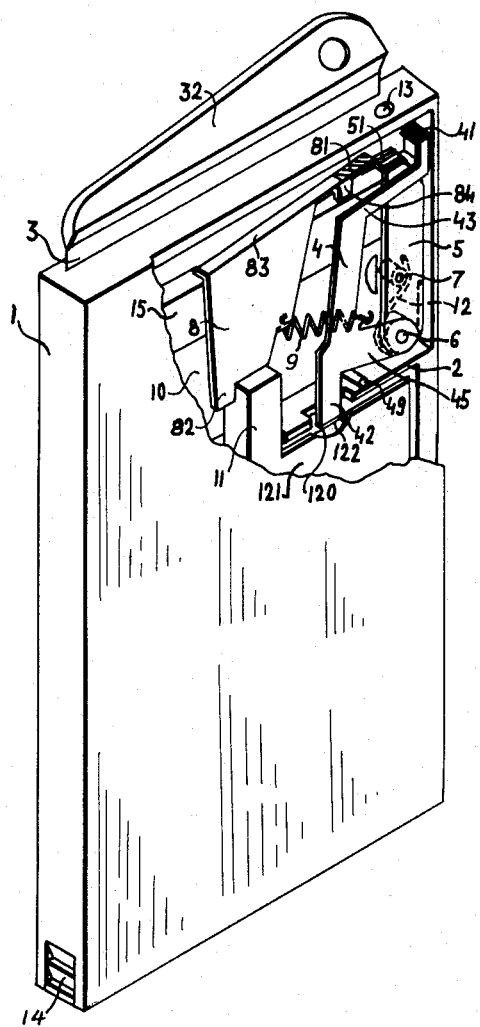
FIG. 1 shows a cassette of the invention in a perspective view, a portion of the back wall of the cassette being broken away to reveal internal structure.

Referring now to the drawing in detail, there is seen a cassette for photographic plates or films having an outer sheet metal shell 1. The space within the shell is divided by a partition 2 into a top compartment 10 and into a main space in which a sheet film holder 121 is received. Access to the main space is had through the bottom wall of the casette, not shown in detail, which is releasably held in position by a locking mechanism of which only an actuating member 14 is seen in FIG. 1. A sheet metal slide 3 forms a portion of the front cover of the cassette and can be pulled out by means of a handle 32 when it is desired to expose a film 120 retained in the holder 121.

An integral abutment lug 11 of the film holder 121 projects into the compartment 10 through an opening in the partition 2. Another opening in the partition is aligned with a notch 122 of the film holder 121 in which an edge portion of the film 120 is accessible. An approximately T-shaped sheet-metal rocker 4 in the compartment 10 has three arms. The free end of one arm 45 is pivotally mounted on a pin 6 which is fixedly attached to the shell 1. Another arm 42 passes through the partition 2 into contact with the top edge of the film 120. The third arm 43 has a face 41 which is black and may be aligned with a window 13 in the top of the shell 1.

A sheet metal arm 5 is also pivoted on the pin 6. A strong torsion spring 12 is coiled about the pin 6. One of the free ends of the spring 12 abuts against the side wall of the shell 1, whereas the other end of the spring bears against a stud 7 on the arm 5, thereby urging the stud into abutting engagement with a longitudinal edge 31 of the slide 3, as better seen in FIG. 2. The free end of the arm 5 is bent to present a face 51 to the window 13 in the position of the apparatus shown in FIG. 1. The face 51 is painted red.

A guide rail 15 in the compartment 10 is parallel to the top of the shell 1. A plate 8 has a narrow, elongated, integral flange 83 which cooperates with the guide rail 15 to limit movement of the plate 8 toward the cassette bottom. An integral detent 82 at the bottom end of the plate 8 cooperates with the lug 11 of the film holder 121 in a manner that will be discussed more fully hereinbelow. The flange 83 projects longitudinally beyond the main portion of the plate 8. Its free end has a face 81 which is painted green and may be aligned with the window 13 as will presently become apparent. A flap 84 depends from the flange 83 near its free end.

A relatively weak helical tension spring 9 connects the plate 8 and the rocker 4 in such a manner as to draw the plate 8 in a direction approximately toward the pin 6, and to normally pivot the rocker 4 in a counterclockwise direction. The engagement of the arm 42 of the rocker 4 with the sheet film 120 keeps the arm 45 of the rocker 4 away from the stop pin 49 which is fixedly attached to the shell 1.

The condition of the casette and of the film contained therein is indicated in the window 13 by a colored face of one of the three signalling members 4, 5, and 8.

The normal position of the signalling mechanism in which all colored faces are in their operative positions is shown in FIG. 2. The film holder 121 is removed from and inserted in the shell 1 by sliding movement in the direction of the double arrow 30 when the cassette bottom is open. As shown in FIG. 2, the film holder is in its operative position, but does not contain a film. The presence or absence of a film is sensed by the arm 42 of the rocker 4. In the absence of a film, the spring 9 pivots the rocker into abutting engagement of the arm 45 with the stop pin 49. In the illustrated position of the rocker 4, the face 41 is aligned with the window 13 and shows its black color.

The plate 8 is held by the spring 9 in a position in which the detent 82 abuts against the top of the lug 11 while the flap 84 on the flange 83 abuts against the end face 51 of the arm 5. The latter is held by the torsion spring 12 against the lateral edge 31 of the slide 3. It will be understood that the spring 12 is much stronger than the spring 9 and that the position of the arm 5 is thus not affected by the spring 9.

The colored portions 81 and 41 of the signalling members 8, 4 are also aligned with the window 13, but the dimensional relationships of the members 4, 5, 8 and their positions in the shell 1 are such that the black face 41 is superimposed on the green face 81 which in turn covers the red face 51. The faces 51, 81 are thus obscured by the face 41. Because the several signalling elements are made of sheet material, they do not interfere with the movement of each other, as is best seen in the sectional view of FIG. 6, which illustrates the condition of the device also shown in FIG. 1.

When a sheet of film 120 is inserted in the holder 121, the presence of the film is sensed by the arm 42, and the rocker 4 is pivoted clockwise from the position shown in FIG. 2 into that illustrated in FIG. 3. The resulting displacement of the black face portion 41 exposes the underlying green face portion 81 of the flange 83. No other change in the signaling mechanism is caused by the introduction of the film 120. The face 51 of the arm 5 remains obscured.

In order to expose the film 120 to light, the slide 3 must be pulled out of the shell 1 by the handle 32. As seen in FIG. 7, the slide has a notch 33 in its side edge 31. The upper wall 33a of the notch is inclined at a small acute angle relative to the edge 31, but the bottom wall of the notch meets the edge 31 approximately at right angles.

When the slide is pulled by the handle 32, the stud 7 travels in camming engagement along the edge 31 until it drops into the notch 33 and prevents further outward movement of the slide 3 as shown in FIG. 4. The lower edge of the slide 3 clears the top edge of the film 120. Camming engagement with the notch 33 of the stud 7 permits the arm 5 to pivot counterclockwise on the pin 6 under the pressure of the spring 12. Because of the engagement between the free end of the arm 5 with the flap 84, the plate 8 is shifted along the guide rail 15 and the top surface of the lug 11 until the detent 82 drops over the edge of the lug and engages a side face of the lug 11.

The resulting position of the three signaling members is illustrated in FIG. 4. The position of the rocker 4 has not been changed by withdrawal of the slide 3, and the black end portion 41 is out of alignment with the window 13. The red face portion 51 of the arm 5 and the green portion 81 also have been shifted from the line of sight with the window 13.

When the slide 3 is returned to its normal position after exposure of the film 120, the stud 7 moves out of the notch 33, and the arm 5 is returned to its normal position in which the red face portion 51 is aligned with the window 13. The plate 8 is prevented from following the tension of the spring 9 by abutting engagement of the detent 82 with the side face of the lug 11. The red spot visible in the window 13 indicates that the film 120 has been exposed. The corresponding position of the signaling mechanism is shown in FIG. 5 and also in FIGS. 1 and 6.

When the exposed film is to be removed or replaced, the film holder 121 with the film 120 is withdrawn from the shell 1 through the bottom of the cassette. The lug 11 thereby releases the detent 82, and the plate 8 is moved by the spring 9 into a position in which the flap 84 abuts against the free end of the arm 5 and the detent 82 is aligned with the top of the lug 11 in the direction of the double arrow 30 in FIG. 2. When the sheet metal holder 121 is reinserted empty into the cassette, the mechanism assumes the position shown in FIG. 2, and a black spot is visible in the window 13. When a fresh film is loaded in the holder 121 prior to insertion, green is shown in the window, as is evident from FIG. 3.

The three signaling members 4, 5, 8 thus cooperate to generate a black signal in the window 13 when the absence of a film is sensed by the arm 42 of the rocker 4. A green signal is generated in response to the reciprocating movement of the film holder 121, but this signal is obscured by a simultaneously generated black signal. A red signal is generated in response to the reciprocating movement of the slide 3 away from and back toward its operative position in which it covers an aperture in the shell 1 over the film 120. The last-mentioned signal is obscured by both the black and green signals.

While the signaling mechanism of the invention has been described with reference to sheet film and to a film holder, it is obviously not limited thereto. A light-sensitive sheet material other than a film may be inserted in the holder 121. Sensitized paper and a glass plate carrying a silver halide emulsion are specifically contemplated. If a glass plate or other relatively rigid carrier is employed, a holder which ensures flatness of the light sensitive layer is not needed, and may be replaced by other positioning means which hold the carrier in the desired position. The use of leaf springs is conventional in this art to hold a glass plate in proper position within a cassette. The free ends of the springs engage the edges of the glass plate and are resiliently displaced during insertion of the plate in the cassette. The modification of the signaling mechanism necessary for making the mechanism responsive to the reciprocating movement of such a spring during removal or replacement of a plate in the cassette will be obvious to those skilled in the art.

Obviously, many other modifications and variations of the present invention are possible in the light of the above teachings. It is therefore to be understood that, within the scope of the attached claims, the invention may be practiced otherwise than as specifically described.

What is claimed is:

1. A cassette arrangement comprising, in combination:
(a) a shell enclosing a spac therein, said shell including a cover member movable toward and away from an operative position in which said cover member closes an aperture in said shell;
(b) positioning means movable toward and away from an operative position for positioning light-sensitive sheet material in said space in a predetermined position for being exposed to light through said aperture;
(c) sensing means for sensing the presence and absence of said sheet material in said predetermined position;
(d) first signaling means operatively connected to said sensing means for generating a first visible signal in response to the sensed absence of said sheet material;
(e) second signaling means responsive to said movement of said positioning means for generating a second visible signal;
(f) third signaling means responsive to said movement of said cover member for generating a third visible signal; and
(g) a partition dividing said space into two compartments, said first, second, and third signaling means including a plurality of signaling members in one of said compartments, said shell being formed with a window having a line of view into said one compartment, three of said signaling members carrying respective indicia, said indicia when visible through said window constituting said visible signals, said positioning means and said predetermined position being in the other compartment, said cover member having an edge portion extending in the direction of said movement thereof, said edge portion constituting cam means, and a second one of said signaling members being mounted in said one compartment for movements toward and away from an operative position thereof in camming engagement with said cam means when said cover member reciprocally moves toward and away from the operative position thereof, the indicia carried by said second member being in said line of sight when said second member is in the operative position thereof and constituting said third signal.

2. An arrangement as set forth in claim 1, further comprising an abutment member on said positioning means having two abutment faces, a third one of said signaling members being movable between respective first and second positions in which said third member abuts said abutment faces, yieldably resilient means for holding said third member in engagement with said abutment faces in said first and second positions respectively, the indicia carried by said third member being aligned with said window when said third member is in said first position thereof, and motion transmitting means interposed between said second and third members for moving said third member from said first to said second position thereof when said second member moves away from said operative position thereof.

3. An arrangement as set forth in claim 2, in which the indicia on said third member are interposed between said window and the indicia carried by said second member when said third member is in said first position thereof.

4. An arrangement as set forth in claim 1, wherein one of said signaling means includes means for obscuring at least one of the signals generated by the two other signaling means.

5. An arrangement as set forth in claim 1, wherein said first signaling means includes means for obscuring said second and said third signal.

6. An arrangement as set forth in claim 5, wherein said second signaling means include means for obscuring said third signal.

7. An arrangement as set forth in claim 5, wherein said third signaling means include means for obscuring said second signal.

8. An arrangement as set forth in claim 1, wherein each of said signaling means includes means for obscuring at least one of the signals generated by the two other signaling means.

9. A cassette arrangement comprising, in combination:
(a) a shell enclosing a space therein, said shell including a cover member movable toward and away from an operative position in which said cover member closes an aperture in said shell;
(b) positioning means movable toward and away from an operative position for positioning light-sensitive sheet material in said space in a predetermined position for being exposed to light through said aperture;
(c) sensing means for sensing the presence and absence of said sheet material in said predetermined position;
(d) first signaling means operatively connected to said sensing means for generating a first visible signal in response to the sensed absence of said sheet material;
(e) second signaling means responsive to said movement of said positioning means for generating a second visible signal; and
(f) third signaling means responsive to said movement of said cover member for generating a third visible signal, said first, second, and third signaling means including a plurality of signaling members, said shell being formed with a window, three of said signaling members carrying respective indicia, said indicia when visible through said window constituting said visible signals, said cover member having an edge portion extending in the direction of said movement thereof, said edge portion constituting cam means, and a second one of said signaling members being mounted for movements toward and away from an operative position thereof in camming engagement with said cam means when said cover member reciprocally moves toward and away from the operative position thereof, the indicia carried by said second member being in said line of sight when said second member is in the operative position thereof and constituting said third signal.

References Cited by the Examiner

UNITED STATES PATENTS

| | | | |
|---|---|---|---|
| 1,143,462 | 6/1915 | Teige et al. | 95—71 |
| 1,162,385 | 11/1915 | Niell | 95—66 |
| 2,656,771 | 10/1953 | Nasselblad | 95—71 |

JOHN M. HORAN, *Primary Examiner.*